Aug. 29, 1944. W. T. HOUSER 2,357,002
VALVE
Filed June 26, 1943
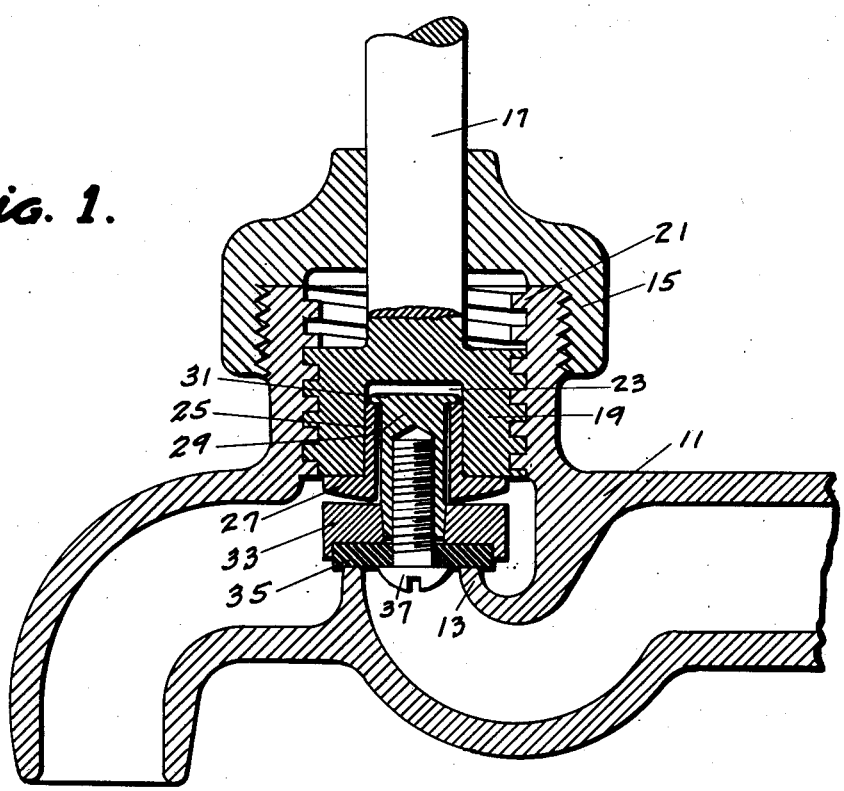
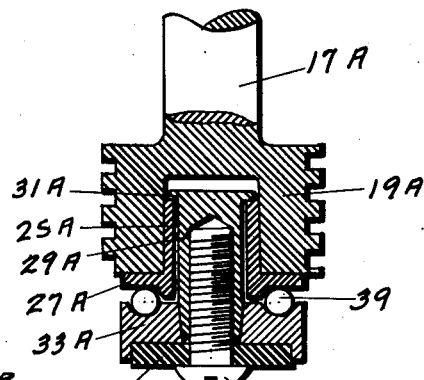
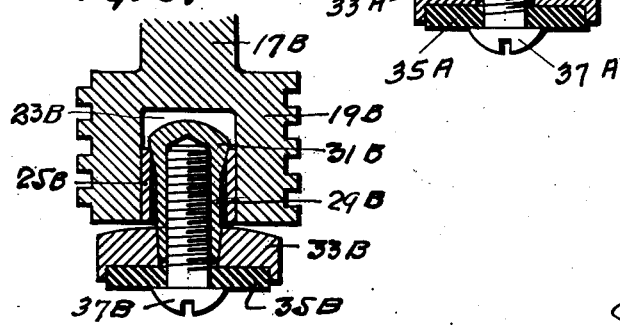
INVENTOR.
WILLIAM T. HOUSER
BY Patented Aug. 29, 1944

2,357,002

UNITED STATES PATENT OFFICE 2,357,002

VALVE

William T. Houser, Memphis, Tenn.

Application June 26, 1943, Serial No. 492,392

5 Claims. (Cl. 251—46)

This invention relates to improvements in valves, such as form part of faucets.

Water faucets in ordinary plumbing are ordinarily provided each with a rising stem which is faced at its lower end with a washer of hard fiber or rubber, the washer co-acting by direct thrust against an annular seat to effect cut-off of flow, the seat being concentric with the stem and the valve seated by turning movement of the valve stem as it is screwed down. The seat is ordinarily smooth and highly polished when the valve is new, but after a short use becomes more or less rough and each seating movement, and to a lesser extent, each opening movement of the valve grinds and tends to destroy the valve washer, causing leakage, eventually making it necessary, after first cutting off the water flow to the faucet, which is often troublesome, to remove the faucet cap and stem and replace the washer.

Also in many cases, the end of the valve stem against which the washer seats is not exactly at right angles to the axis of rotation of the stem and considerable pressure is often necessary to effect complete seating and cut-off, additionally inviting destruction of the washer.

The objects of the present invention are:

To provide a washer carrier for the end of the valve stem which is freely rotatable with relation to the stem;

To provide a carrier for the washer which has a limited amount of lateral play relative to the valve stem;

To provide a carrier for the washer which is simple and rugged in construction and has a minimum number of parts;

To provide a carrier for the washer which may form a part of an original valve construction, or may be readily applied in the repair of used faucets; and Particularly to simplify the design and construction of such a device.

The means by which the foregoing and other objects are accomplished, and the method of their accomplishment, will readily be understood from the following specification upon reference to the accompanying drawing, in which:

Fig. 1 is a sectional elevation showing a typical faucet with my improved valve construction; and Fig. 2 is a similar view of a portion of the valve stem, valve and carrier with an interposed ball thrust bearing; and Fig. 3 a view similar to Fig. 2, showing a modification.

Referring now to the drawing in which the various parts are indicated by numerals:

11 is the body of the faucet, having a typical seat 13 and cap 15. 17 is the valve stem, the lower end 19 of which is threaded to engage complementary threads 21 formed in usual manner in the body of the faucet.

In my construction this lower end 19 of the valve stem is provided with a cylindrical chamber 23 which extends upward from the lower end and is axially alined with the stem.

25 is an annular sleeve adapted to fit the cylindrical bore 23 of the stem and to be retained in this bore by friction. The sleeve 25 preferably has an outwardly extending annular flange 27 which underlies and seats against the bottom end of the valve stem. This flange is thinner at its outer edge than adjacent the bore of the sleeve 25 to allow seating play of the washer disc thereagainst.

29 is a post of slightly smaller diameter than the bore of the sleeve 25 to allow lateral play relatively thereto, this post having its upper end enlarged, as by an annular flange 31 which overlies the upper end of the sleeve 25 and retains the post against removal. The post 29 extends blow the flange 27, the extension being slightly tapered and if desired may be square.

33 is a washer disc which is centrally apertured to engage and fit the tapered end of the post 29, the aperture in the disc being of such size that when the disc is firmly wedged on the post its upper face will clear the lower face of the flange 27 and allow a limited amount of play longitudinally with relation to the valve stem.

35 is the usual valve washer of hard fiber, hard rubber or the like, this washer being held to the disc 33 by a cap screw 37.

In Fig. 2, parts substantially identical with those hereinabove described are identified by the same numeral with the addition of the letter "A." In this form of the device the upper side of the disc 33—A is grooved to form a raceway for balls 39 and the flange 27—A is spaced above the top of the balls 39 to again allow a limited amount of longitudinal play of the disc relatively to the flange.

It will be noted that the depth of the raceway for the balls 39 is greater than the spacing between the lower side of the flange 27—A and the top of the balls in order that under no possible condition can the balls become displaced from the raceway; and also that the raceway is laterally of greater width than the diameter of the balls allowing them a limited amount of lateral play in the raceway.

In Fig. 3 a slight modification of some of the parts is shown, a retaining sleeve 25—B which has no flange and has its lower end flush with the lower end of the valve stem 17—B, and a washer disc 33—B, preferably curved on top, which is allowed to seat directly against the end of the sleeve and of the valve stem 17—B, are used. In this view also a post 29—B is shown which has an enlarged head 31—B in lieu of the definite flange 31, or 31—A previously shown, this enlarged head engaging the upper end of the sleeve 25—B, to retain the post in place. In this, as in the previous forms, the post 29—B is very loosely mounted in the sleeve 25—B and the upper face of the disc 33—B is spaced away from the lower end of the sleeve and post.

In new construction, or installing a post and valve in an old faucet, an assembly is formed by inserting the post 29 through the sleeve 25, placing the disc 33 on the tapered end of the post and wedging the disc to a tight fit on the post by forcing the tapered post end into the disc in desired manner, either by clamping them together or if desired, by supporting the lower face of the disc and driving the post into the disc or by supporting the upper end of the post and driving the disc onto the post, completing the assembly. The washer 35 is placed against the disc and secured by the cap screw 37, the disc 33 being held, and through frictional engagement with the post, holding the post during setting up of the screw.

The end 19 of the valve stem is chambered to receive the sleeve 25 and the assembly, with or without the washer, is placed in, driven or otherwise forced into place.

In some old faucets it is necessary to slightly shorten the stem to allow for the extra thickness of the flange 27, and disc 33, but otherwise the steps are in general the same as in new construction.

Should it later be necessary for any reason to replace the washer 35, the screw 37 is removed and the washer replaced in usual manner, the initial tightening of the disc on the post holding it in place during such change of washers. During removal of the screw 37, or tightening of the same screw, the disc may readily be held against turning, the post being held by the disc.

In that form of the device shown in Fig. 2, the steps are identical except that the balls 39 must be placed in the raceway of the disc 33—A in building up the assembly.

In use of the device, when the valve is closed the washer 35 seats in usual manner on the seat 13 of the faucet. If any part of this seat be high relatively to other portions thereof, the play between the post 29 and the sleeve 25, and the play between the bottom of the flange 27 and the top of the disc 33, permit the washer 35 to adjust itself flatly against the seat, and, as engagement of the washer with the seat retards turning movement of the washer, the pivotal mounting of the post and disc relatively to the retaining sleeve and valve stem permit the stem to rotate, with a minimum of turning effect on the washer itself, wear due to unequal seating and turning movement of the stem being thereby substantially eliminated.

The same is true of that form of the device shown in Fig. 2, except that the interposed balls, or such of them as take the thrust, additionally minimize the torsional effect of the stem on the disc and washer.

It will be understood that while I have shown this valve in connection with a faucet, as illustrative of that type of valve which is most often opened and closed under ordinary conditions, that it may be used with rising stem, globe or many other valves.

I claim:

1. In a valve having an annular seat and a rotatable rising stem concentric with said seat, a chamber in the lower end of said stem and concentric therewith, a cylindrical post, having its upper end enlarged, disposed in said chamber, a sleeve loosely surrounding said post, disposed in said chamber and underlying said enlarged post end, and retained by engagement with the wall of said chamber, said sleeve having its lower end outwardly flanged to underlie the lower end of said stem around said chamber, said post having a tapered lower end extending beyond the lower end of said sleeve and being internally bored and threaded, a disc centrally apertured in conformity with the projecting end of said post and secured thereon, a washer as of hard fiber seated against the lower face of said disc, and a screw conforming to the internal threading of said post, clamping said washer against said disc, said post between its enlarged upper end and said disc being of greater length than said sleeve and adapted to space the upper face of said disc from the end of said sleeve and allow limited free longitudinal movement of said disc into and out of engagement with the lower end of said sleeve.

2. In a valve having an annular seat and a rotatable rising stem concentric with said seat, a chamber in the lower end of said stem and concentric therewith, a cylindrical post, having its upper end provided with a laterally extending flange, disposed in said chamber, a sleeve loosely surrounding said post, disposed in said chamber underlying said post flange and retained by engagement with the wall of said chamber, said sleeve having its lower end outwardly flanged to underlie the lower end of said stem around said chamber, said post having a tapered lower end extending beyond the lower end of said sleeve and being internally bored and threaded, a disc centrally apertured in conformity with the projecting end of said post and wedged thereon, a washer as of hard fiber seated against the lower face of said disc, a screw conforming to the internal threading of said post, clamping said washer against said disc extension, said disc on its upper face being grooved to provide a raceway, and balls disposed in said raceway, said post between its said flange and said disc being of greater length than said sleeve, and adapted to space the tops of said disc-carried balls from the lower end of said sleeve flange and allow limited free longitudinal movement of said balls into and out of engagement with the lower end of said sleeve.

3. In a valve having an annular seat and a rotatable rising stem concentric with said seat, a chamber in the lower end of said stem and concentric therewith, a round post, having its upper end enlarged, disposed in said chamber, a sleeve loosely surrounding said post, disposed in said chamber underlying said enlarged post end and retained by frictional engagement with the wall of said chamber, said post extending beyond the lower end of said sleeve and being internally bored and threaded, a disc centrally apertured in conformity with the projecting end of said post and frictionally secured thereon, a washer as of hard fiber seated against the lower face of said disc, and a screw conforming to the internal threading of said post, clamping said washer against said disc and said disc on said post, said post between its enlarged upper end and said disc being of greater length than said sleeve, and adapted to space the upper face of said disc from the end of said sleeve and allow limited free longitudinal movement of said disc into and out of engagement with the lower end of said sleeve.

4. In a valve having an annular seat and a rotatable rising stem, a chamber formed in the lower end of said stem and concentric therewith, a round post, having an enlarged upper end, disposed in said chamber, a sleeve, loosely surrounding said post, removably secured in said chamber, and underlying said enlarged post end, said post having its lower end portion projecting beyond the ends of said sleeve and stem and being internally bored and threaded, a centrally apertured disc frictionally secured on said lower post end portion in loosely spaced relation to said sleeve and stem ends, a washer as of hard fiber seated against said disc and a screw conforming to the internal threading of said post securing said washer against said disc.

5. In a valve having an annular seat and a rotatable rising stem concentric with said seat, a cylindrical chamber in the lower end of said stem and concentric therewith, a cylindrical post, having its upper end provided with a laterally extending flange disposed in said chamber, an annular sleeve loosely surrounding said post, disposed in said chamber underlying said post flange and retained by engagement with the cylindrical wall of said chamber, said sleeve having its lower end outwardly flanged to underlie the lower end of said stem around said chamber, the under side of said flange sloping upwardly toward its peripheral edge, said post having a tapered lower end projecting beyond the lower end of said sleeve and being internally bored and threaded, a disc centrally apertured in conformity with the projecting end of said post and wedged thereon, a washer as of hard fiber seated against the lower face of said disc, and a screw conforming to the internal threading of said post, securing said washer against said disc, said post between its said flange and said disc being of greater length than said sleeve, and adapted to space the upper face of said disc from the lower end of said sleeve, and allow limited free longitudinal movement of said disc into and out of engagement with the lower end of said sleeve.

WILLIAM T. HOUSER.